United States Patent [19]
Alberding

[11] 4,139,168
[45] Feb. 13, 1979

[54] TAPE CASSETTE

[76] Inventor: Edgar P. Alberding, P.O. Box 382, Salem, Ind. 47167

[21] Appl. No.: 818,579

[22] Filed: Jul. 25, 1977

[51] Int. Cl.$^2$ .................... G11B 23/10; G11B 15/26
[52] U.S. Cl. .................... 242/199; 226/170; 242/55.19 A; 242/209; 360/132
[58] Field of Search .............. 242/199, 200, 198, 197, 242/55.19 A, 76, 55.19 R, 206, 209; 360/93, 96, 132; 226/170, 171, 172

[56] References Cited
U.S. PATENT DOCUMENTS

| | | | |
|---|---|---|---|
| 2,912,179 | 11/1959 | Schuyler | 242/200 |
| 3,549,104 | 12/1970 | Morrow et al. | 242/209 |
| 3,596,006 | 7/1971 | Lawhon | 242/199 |
| 3,609,021 | 12/1971 | Gill | 242/199 |

FOREIGN PATENT DOCUMENTS

| | | | |
|---|---|---|---|
| 970748 | 7/1975 | Canada | 242/55.19 A |
| 2155186 | 5/1973 | Fed. Rep. of Germany | 242/55.19 A |

*Primary Examiner*—George F. Mautz
*Attorney, Agent, or Firm*—Gilbert E. Alberding

[57] ABSTRACT

An endless belt is rotatably supported upon guide rollers within a cassette case for engagement with a tape, the belt contacting the tape along a major segment of the tape-connecting portion as defined between the two fixed cores therein. The novel features of this invention provide an effective and unitary unit with reduction in jamming as well as flutter and wow problems often associated with tape cassettes of the prior art.

7 Claims, 4 Drawing Figures

TAPE CASSETTE

BACKGROUND OF THE INVENTION

This invention herein pertains generally to improvements in the cassette art, and especially to improved means for maintaining magnetic tapes, optical tapes and the like in a confined and stable configuration.

The practice of retaining a tape upon which sound characteristics have been stored and from which such characteristics can be readily recalled by dynamic means has become popular in view of the ease with which such tapes can be handled, particularly in the form of cassettes. Some cassettes structures have a single core system in which a tape is simply wound off a rotatable core portion and taken up on another portion of a core after having passed through a mechanism having reproducing means. Most cassette structures have two cores upon which a tape is wound in such a manner that one core winds as the other core unwinds so that a tape-connecting portion is exposed to the reproducing mechanism of the machine. In either a single core or a double core system the relatively confined spacial considerations of such cassettes place relatively strict limitations upon the amount of tape which can be physically stored therein. In order to house a sufficient quantity of tape within the cassette, it is necessary to make the tape as thin as feasible. It follows that this creates a number of problems for such exceedingly thin and delicate tape structures such as their tendency to yield or stretch and even to fracture and break. Further, there is oftentimes a noticeable tendency to oscillate or vibrate longitudinally during a playing operation. Moreover, a thin and delicate tape structure has the propensity on occasions to wind itself around any protrusion, capstan or like member resulting in a tangled mass of tape with subsequent jamming of the cassette and machine.

SUMMARY OF THE INVENTION

It is accordingly an object of the present invention to provide an improved cassette structure having few functional parts and of simple and economic construction.

Another object of the subject invention is to provide a guiding means for cassettes to aid and facilitate tape movement therethrough.

Still another object of the present invention is to provide an improved cassette configuration having substantially reduced longitudinal vibrations or flutter and wow for such tape members.

Another important aspect of the subject invention is to provide a device for eliminating or greatly reducing the possibility of jamming within a cassette of a tape structure which occurs by winding around a capstan, roller or like member during a playing operation.

These and other objects of the invention will become more readily apparent from a review of the specifications, claims and a study of the attached drawings.

Briefly, in accordance with this invention an improved tape cassette configuration is described and claimed for a machine having a reproducing head and tape driving means associated therewith, said tape cassette comprising a case having a side opening, means connected to said case for advancing a length of tape adjacent the side opening, a guide means mounted in the case and disposed apart from the side opening, and a belt trained on said guide means and engaging the length of the tape advancing adjacent said side opening. Another embodiment of the subject invention comprises at least two pairs of guide means rotatably mounted in the case, each pair being situated and adjacent the plurality of side openings of said case, and two endless belts each trained on said at least two pairs of guide means, each endless belt engaging substantial segments of said tape-connecting portion along the length thereof.

The aforementioned features with the objects and advantages which shall become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENTS

Figure 1:
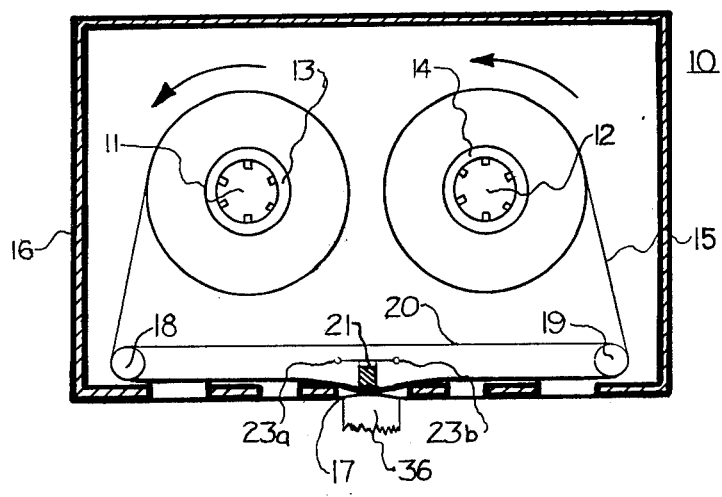
FIG. 1 is a transverse sectional view of the tape cassette comprising one embodiment of the invention.
Figure 2:
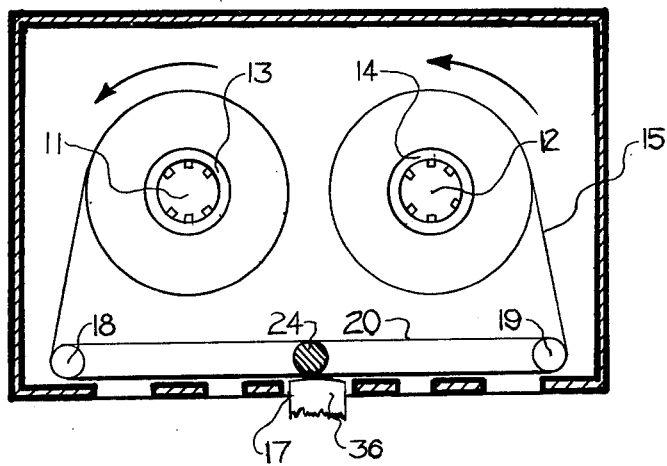
FIG. 2 is a transverse sectional view of the tape cassette comprising another embodiment of the invention.

Reference will be made to all the Figures and with particular reference to FIG. 1 the tape cassette is denoted by numeral 10, the same having two shaft members 11 and 12 to which are attached cores 13 and 14 for winding a tape 15 thereon, the cores 13 and 14 being rotatably supported to said shaft members 11 and 12, respectively. The cassette 10 has a side wall 16 extending around the periphery thereof and has an opening 17 therein. In FIG. 1 there is shown a roller 18 disposed leftwardly and one another roller 19 disposed rightwardly of the center of the cassette 10 and an endless belt 20 trained about said guide rollers 17 and 18. It is to be noted that the tape 15 as it passes between the cores 13 and 14 is in pressing engagement with the endless belt 20. A resilient pad 21 is supported by a band 22 secured between pegs 23a and 23b whereby the pad 21 comes in direct contact with the back side of the endless belt 20. In another embodiment of the invention depicted in FIG. 2 the resilient pad is replaced by an elastomeric sleeve 24 rotatably mounted to case 10 intermediate the guide rollers 17 and 18.

Figure 3:
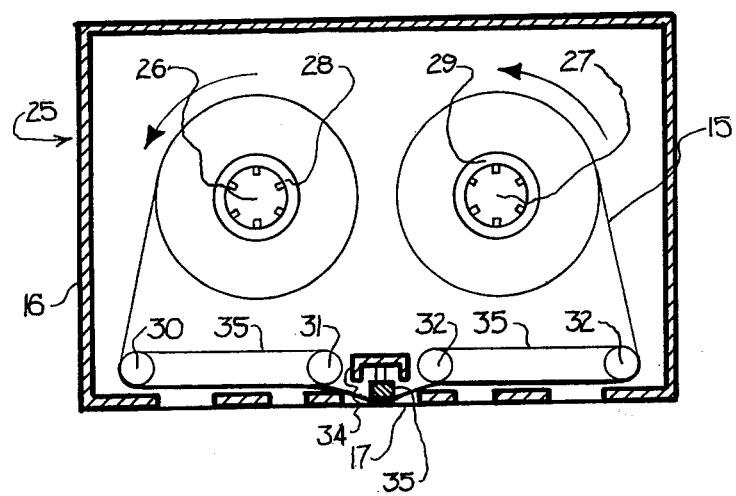
FIG. 3 is a transverse sectional view of the tape cassette comprising yet another embodiment of the invention.

In FIG. 3 there is depicted a cassette case 25 having two shaft members 26 and 27 to which are attached cores 28 and 29 rotatably supported therein. The tape cassette is provided with a pair of guide rollers 30 and 31 to one side of the opening 17 and another pair of guide rollers 32 and 33 to the other side thereof. One endless belt is trained about guide rollers 30 and 31 and another endless belt is trained about guide rollers 32 and 33.

Situated between rollers 31 and 32 is a housing plate 34 to which is attached a resilient pad 35 which applies a gentle force against the back side of the tape 15 during the passage thereover.

Figure 4:
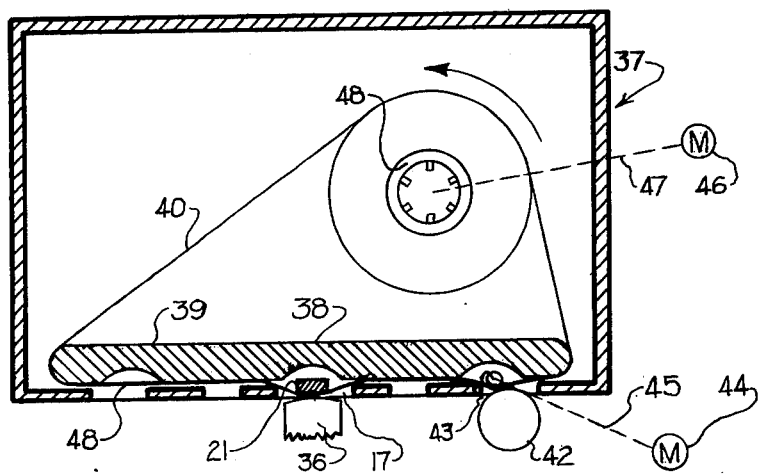
FIG. 4 is a transverse sectional view of the tape cassette comprising still another embodiment of the invention.

In FIG. 4 there is depicted another preferred embodiment of the subject invention wherein 37 denotes a cassette case having a single guide member 38, said member being affixed within said cassette. Around the guide member 38 is trained a belt 39 and over which is placed an endless tape 40, the tape 40 being rolled at core 41. In practice the tape 40 is advanced via pinch roller 42 and capstan 43 which is motorized by a conventional motor 44 through drive train 45. Core 41 is likewise driven by a motor 46 through drive train 47.

In operation the driving means turns the roll of tape 15 in the direction as indicated by the arrows in FIG. 1 and presents a tape-connecting portion 15 which travels in constant engagement with a substantial segment of the endless belt 20 and thereafter is taken up by core 14. It will be appreciated that the length of tape-connecting portion passes in contact with the endless belt is urged outwardly towards the opening 17 over the resilient pad 21. In this manner the tape is placed into engagement with the transducing head 36 of a conventional receiving machine.

In reference to FIG. 4 driving means 44 and 46 turns the tape 40 in the path indicated by the arrow which causes belt 39 to move in the path indicated. Thus, the length of the tape connecting portion 48 passes in contact with the belt 39 and is urged outwardly towards the opening 17 over the resilient pad 21. It can be seen that the tape is therefore placed into engagement with the transducing head 36 of a conventional receiving machine. It will be readily appreciated that core 41 may support a roll or a reel of the type utilized in long playing endless tapes.

In a cassette of this invention the tape as it is being driven does not have the tendency of jamming the tape by winding around a roller, a capstan or the like. Further, it has been observed that longitudinal vibrations of the tape is substantially reduced by the particular structural features of this invention.

It is believed that a careful consideration of the specification in conjunction with the means of the drawing will enable a reader to obtain a clear and comprehensive understanding of the subject matter of the invention, the features and advantages, mode of use and improved result which is assured the user.

The foregoing is considered as illustrative only of the principles of the instant invention. Further, since a number of modifications and changes will readily occur to those skilled in the art, it is not desired to limit the invention to the exact construction shown and described, and accordingly all suitable modifications and equivalents may be resorted to falling within the scope of the invention as claimed.

I claim:

1. A tape cassette comprising a case having a plurality of side openings on one side thereof, means connected to said case for advancing a length of tape adjacent the plurality of side openings, a single guide means mounted in the case and disposed apart from the side openings, and a belt trained on said single guide means and engaging essentially the full length of the tape advancing adjacent said side openings.

2. A tape cassette of claim 1 wherein the advancing means includes a core member engaging the tape and situated between and spaced apart from the said guide means.

3. A tape cassette as recited in claim 1 wherein the tape is connected at its ends to form a continuous tape structure.

4. In a tape cassette for a machine having a tape head and tape driving means, said tape cassette comprising a case having a plurality of side openings on one side thereof, a pair of spaced apart cores rotatably mounted in said case, each core having means for securing thereto one end of a continuous length of tape which can be wound in roll form on each core so as to leave a tape-connecting portion between the rolls of tape wound on said cores, at least two guide means mounted in the case and being leftwardly and rightwardly of said plurality of side openings of said case, an endless belt trained on said at least two guide means and passing adjacent said plurality of openings and engaging essentially the full length of said tape-connecting portion adjacent said side openings, and resilient means mounted to the case and within the loop formed by said endless belt.

5. A tape cassette as recited in claim 4 wherein the resilient means is rotatably mounted.

6. A tape cassette as recited in claim 4 wherein there are two guide means proximate the side of said cassette.

7. A tape cassette for a machine having a tape head and tape driving means, said tape cassette comprising a case having a plurality of side openings on one side thereof, a pair of spaced apart cores rotatably mounted on the case, each core having means for securing thereto one end of a continuous length of tape which can be wound in roll form on each core so as to leave a tape-connecting portion between rolls of tape wound on said cores, two pair of guide means mounted in the case, each pair being situated proximate and adjacent the plurality of side openings of said case, and two endless belts engaging major segments of said tape-connecting portion along its length and resilient means mounted between the two pair of guide means, said resilient means facing the tape head and engageable with said tape-connecting portion of the tape.

* * * * *